United States Patent

Mansell

[11] 3,880,527
[45] Apr. 29, 1975

[54] ANNULAR BEAM RADIAL SCANNER

[75] Inventor: Dennis N. Mansell, Palos Verdes, Calif.

[73] Assignee: The United States of America as represented by the Secretary of the Air Force, Washington, D.C.

[22] Filed: Sept. 23, 1971

[21] Appl. No.: 183,002

[52] U.S. Cl.................................. 356/213; 356/225
[51] Int. Cl.............................. G01j 1/00; G01j 1/42
[58] Field of Search......... 250/218, 237 R; 356/213, 356/219, 225, 233, 43, 44, 45, 102, 103, 104

[56] References Cited
UNITED STATES PATENTS
3,310,680   3/1967   Hasegawr.......................... 356/104

*Primary Examiner*—Ronald L. Wibert
*Assistant Examiner*—Conrad Clark
*Attorney, Agent, or Firm*—Arsen Tashjian

[57] ABSTRACT

Apparatus for scanning a preselected annular portion of an annular shaped light beam to determine the power output of the preselected annular portion of the light beam. Apparatus includes: a paraboidal mirror upon which the annular shaped beam is impinged and by which the beam is reflected; a mirror with an annular aperture through which is transmitted the preselected annular portion of the reflected annular shaped light beam; and a concave reflector by which the preselected and transmitted annular portion of the beam is reflected, converged and directed to a power meter which measures the power output of the preselected annular portion of the annular shaped light beam.

4 Claims, 3 Drawing Figures

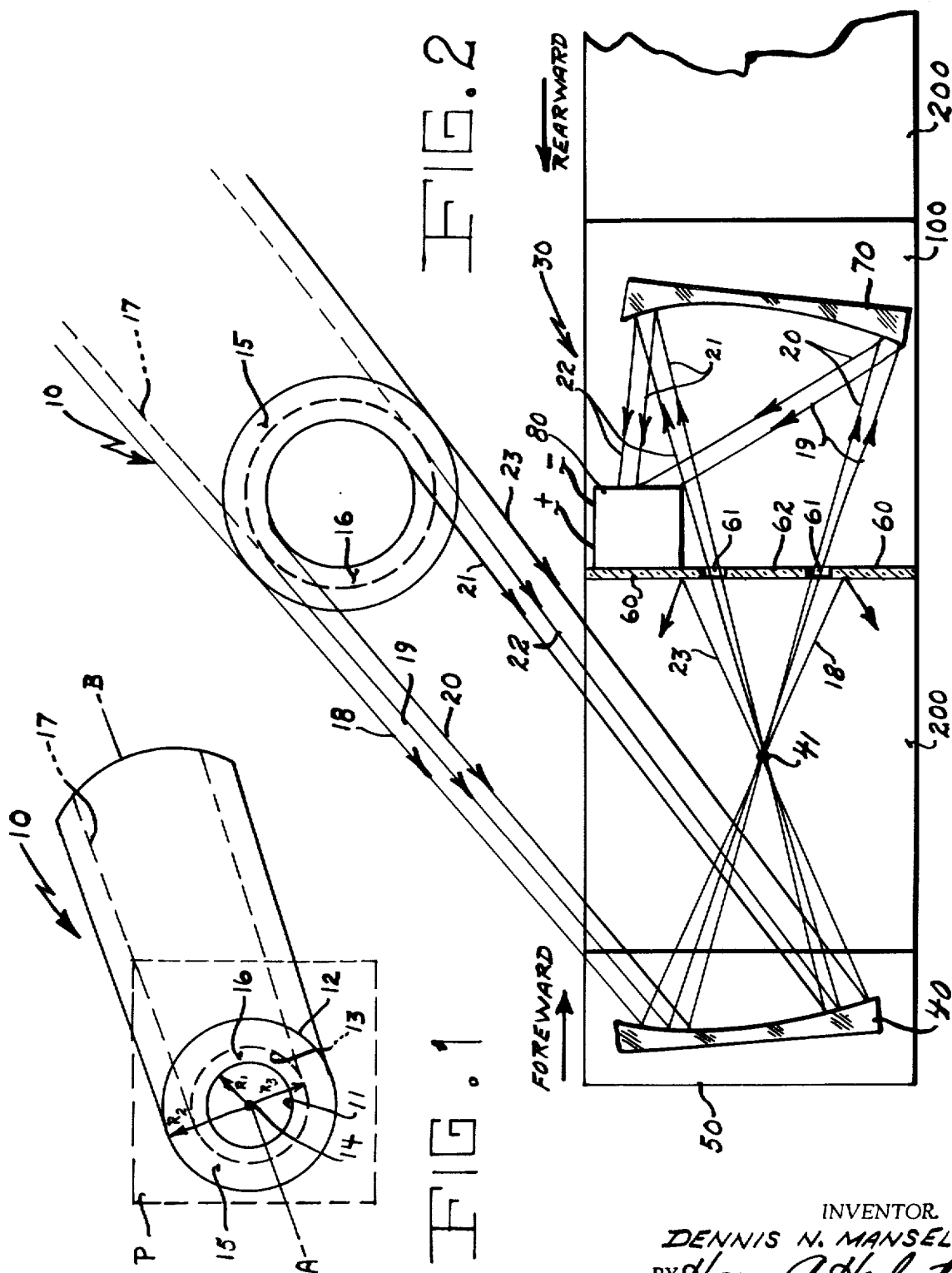

ANNULAR BEAM RADIAL SCANNER

BACKGROUND OF THE INVENTION

This invention relates generally to the laser art and, more particularly, to apparatus for scanning an annular shaped light beam emitted by a laser.

As used herein, the phrase "annular shaped light beam," or the like, is intended to mean a collimated light beam which is annular shaped (i.e., an annulus) in vertical cross-section. Additionally, the phrase "annular portion of an annular shaped light beam," or the like, is intended to mean a portion of the annular shaped beam wherein the portion is in vertical cross-section, a concentric but smaller annulus than the annulus formed by the vertical cross-section of the annular shaped light beam. These phrases will be illustrated and further discussed below.

Additionally, the terms "optically aligned," "optical alignment," and the like, are intended to mean that the optical or other components referred to are in line with each other in the sense that they are in the path of the beam of light which is being emitted, reflected, transmitted, or the like.

With the rapid advance in the laser state-of-the-art, it has become possible to have a laser, such as a conventional $CO_2$-$N_2$-He laser, emit or produce an annular shaped light beam. The method which is used to produce the annular shaped light beam includes the use of an unstable confocal resonator with the laser. However, it is to be noted that neither the method nor the apparatus to produce the annular shaped light beam form any part of my invention. Additionally, an understanding of the method or of the apparatus to produce the annular shaped light beam is not necessary for understanding my invention. Therefore, neither the method nor the apparatus will be discussed further herein. However, a further discussion, if desired, may be found in Volume QE-5 of IEEE Journal of Quantum Electronics, dated December 1969, in an article by William F. Krupke and Walter R. Sooy entitled "Properties of an Unstable Confocal Resonator $CO_2$ Laser System" and references cited therein.

As a result of the ability to produce a laser emitted annular shaped light beam, it is often desirable and sometimes necessary, particularly in research, to know the watt power output of a particular annular portion of the emitted annular shaped light beam, rather than of the entire annular shaped light beam. The prior art, as far as it is known by the applicant, does not disclose the existence or availability of any apparatus which can be used, or can be adapted to be used, to permit the scanning and the resultant power output measurement of any desired preselected annular portion of an annular shaped light beam. There exists, therefore, a genuine need for such an apparatus.

I have invented such a novel apparatus and have thereby significantly advanced the state-of-the-art.

SUMMARY OF THE INVENTION

This invention pertains to apparatus for scanning any desired preselected annular portion of an annular shaped light beam and ascertaining the power output of said preselected annular portion.

The principal object of this invention, therefore, is to provide novel apparatus for selecting and scanning any desired annular portion of an annular shaped light beam and, thereby, ascertaining the power output of the particular annular portion which has been scanned.

This principal object, and other and related objects of this invention, will become readily apparent after a consideration of the description of the invention and reference to the drawings.

DESCRIPTION OF THE DRAWINGS

FIG. 1 shows, in perspective and in schematic form, a typical annular shaped light beam emitted by a laser with which an unstable confocal resonator is used. Also shown in phantom, is a plane which is perpendicular to the longitudinal axis of the annular shaped light beam, and the resulting vertical cross-section thereof;

FIG. 2 is a top plan view, partially in cross-section and in simplified schematic form, of a preferred embodiment of my invention, including the optical geometry thereof.

DESCRIPTION OF THE PREFERRED EMBODIMENT

Figure 3:
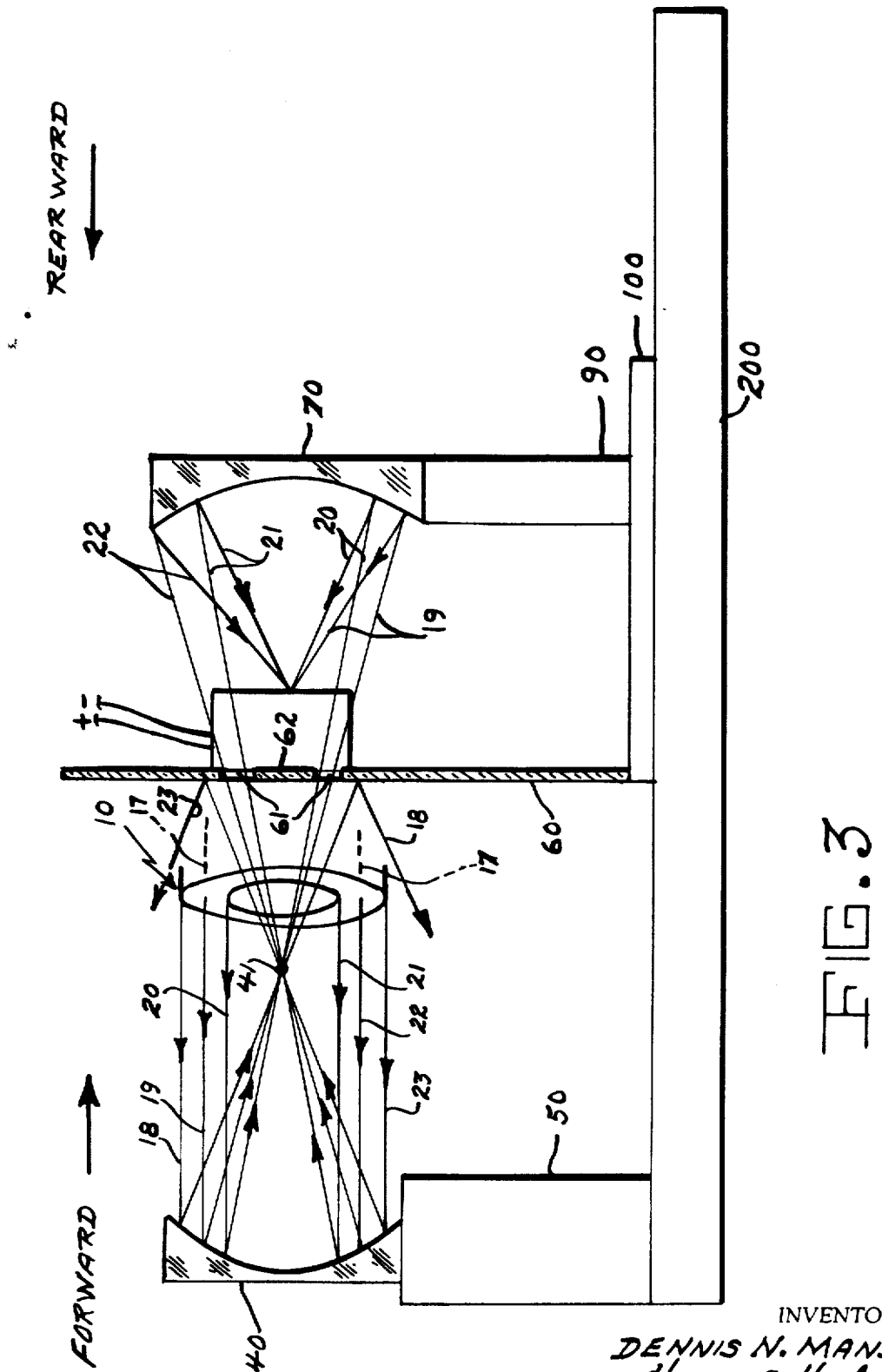
FIG. 3 is a side elevation view, partially in cross-section and in simplified schematic form, of the preferred embodiment of my invention, including the optical geometry thereof, shown in FIG. 2.

It is emphasized, as a preliminary matter, that FIGS. 1–3 are representations in simplified schematic form, but in sufficient detail so that one of ordinary skill in the art can understand, make and use my invention. Specifically, with regard to the optical geometry, including light beam rays shown in FIGS. 2 and 3, these Figures are not intended to depict the optical geometry with the same exactness so that which would be shown in a specific case or situation wherein, for example, optical ray tracing is used to determine precisely the relative positions of the optical components.

As a related matter, the directional designations "forward" and "rearward," and the like, as used herein are intended to mean the directions as indicated by the arrows in FIGS. 2 and 3.

With reference to FIG. 1, therein is shown in perspective and in schematic form a typical annular shaped light beam 10 emitted by a laser (not shown) with which an unstable confocal resonator is used. Also shown in phantom is plane P which is perpendicular to longitudinal axis A–B of annular shaped light beam 10 and which intersects light beam 10 and results in a vertical cross-section thereof. With regard to the cross-section, annulus 15 formed by concentric circles 11 and 12 having geometric center 14, defines the cross-sectional area of annular shaped light beam 10. $R_1$ is the radius from center 14 to the circumference of circle 11; and $R_2$ is the radius from center 14 to the circumference of circle 12. Also shown in the cross-section in FIG. 1 in phantom is circle 13 which is concentric to and with circles 11 and 12. Concentric circles 13 and 11 form annulus 16 which, in turn, defines the cross-sectional area of a typical "annular portion" 17 in phantom of annular shaped light beam 10. $R_3$ is the radius from center 14 to the circumference of circle 13.

In FIG. 2 is shown in simplified schematic form and partially in cross-section a top plan view of a preferred embodiment 30 of my invention. Also shown in schematic form and in perspective is annular shaped light beam 10, previously referred to in FIG. 1, with representative rays 18, 19, 20, 21, 22 and 23 thereof, and annular portion light beam 17 with representative rays 19, 20, 21 and 22 thereof.

Preferred embodiment 30, as shown in FIG. 2, includes: paraboloidal reflector, preferably a mirror, 40 with focus 41, on support 50, with paraboloidal reflector 40 so positioned that annular shaped light beam 10 impinges upon it and is reflected forwardly therefrom; component 60, preferably a flat mirror, with annular aperture or slit 61 therein and circular portion 62 thereof, disposed forward of paraboloidal reflector 40 and so positioned that only the rays, such as 19, 20, 21 and 22 of the desired preselected annular portion, such as 17 of annular light beam 10 pass or are otherwise selected with and transmitted by annular aperture or slit 61 of component 60; concave reflector 70 disposed forward of component 60 and so positioned that the rays, such as 19, 20, 21 and 22 of the desired preselected annular portion 17 of annular shaped light beam 10 impinge upon and are reflected from and converged by concave reflector 70; and a power meter 80, so position that the rays, such as 19, 20, 21 and 22 of the desired preselected annular portion 17 of annular shaped light beam 10 which are reflected from and converged by concave reflector 70 impinge upon, and the watt power thereof is measured by, power meter 80.

Also shown in FIG. 2 is movable platform 90 upon which component 60 and concave reflector 70 may be positioned, fixedly or otherwise, for use in a particular case or situation where a movable platform may be advantageously used. Movable platform 100, when used, is slideably moved forward or rearward on base 200. Further, in an appropriate case or situation, power meter 80 may be attached or be otherwise mounted on component 60, as a matter of convenience. It is to be noted, however, that platform 100, base 200 and support 50 are optional, not essential, components of my invention, and that the attachment of meter 80 to component 60 is not of course necessary for the successful operation of my invention. It is also to be noted that in appropriate cases concave reflector 70 may be a concave mirror or a paraboloidal mirror.

It is further to be noted that paraboloidal reflector 40, component 60 and annular aperture or slit 61, concave reflector 70, and power meter 80 are optically aligned, as defined hereinabove.

It is additionally to be noted that circular portion 62 which defines the inner circumference of annular aperture or slit 61 of component 60 is formed in component 60 by suitable conventional means. For example, circular component 62 may be made integral to component 60 by struts or spider arms which are radially disposed from circular component 62, across annular aperture or slit 61, to that portion of component 60 which defines the outer circumference of annular aperture or slit 61.

With reference to FIG. 3, therein is shown in simplified schematic form and partially in cross-section, a side elevation view of the preferred embodiment 30 of my invention shown in FIG. 2. Also shown in schematic form is annular shaped light beam 10, previously referred to in FIGS. 1 and 2, with representative rays 18, 19, 20, 21, 22 and 23 thereof, and preselected annular portion light beam 17 with representative rays 19, 20, 21 and 22 thereof.

Preferred embodiment 30, as shown in FIG. 3, includes paraboloidal reflector 40 with focus 41, component 60 with annular aperture or slit 61 and with circular portion 62, concave reflector 70, and power meter 80, all of which are disposed and so positioned, relative to each other, to the annular shaped light beam 10, to preselected annular portion light beam 17, and to the representative rays 18, 19, 20, 21, 22 and 23, as set forth in describing preferred embodiment 30 in connection with FIG. 2.

Also shown in FIG. 3 are the following optional components: paraboloidal reflector support 50, concave reflector support 90, movable platform 100 and base 200.

For clarification purposes, it is important to note that due to the side elevation nature of FIG. 3, representative rays 19, 20, 21 and 22 appear to converge to a common focus in FIG. 3. This is not the situation, as can be easily seen from the top plan view shown in FIG. 2. Additionally, also due to the side elevation nature of FIG. 3, it may appear that the axes of the optical components 40, 60 and 70 are coincident with each other and with the longitudinal axis of annular shaped light beam 10. Such is not the situation in this particular case, as can be ascertained from the top plan view shown in FIG. 2. However, components 40, 60, 70 and 80 are, in fact, optically aligned as defined hereinabove.

It is equally important to note that the precise relative position of the optical components (40, 60 and 70) and of power meter 80 in any particular case depends upon a number of variable factors, including the specific properties of the individual optical components to be used, which factors are well known to those of ordinary skill in the art. The "variable" factors are actually definite in any particular case and, therefore, the precise relative positions of the components of my invention may be computed, or may be otherwise ascertained, by means well known in the art, such as mathematical or geometric methods and techniques, including ray tracing.

MODE OF OPERATION OF THE PREFERRED EMBODIMENT

When it is desired to ascertain the power output of any preselected particular annular portion, such as 17 FIGS. 1–3, of an annular shaped light beam, such as 10 FIGS. 1–3, my invention may be used efficiently, effectively and rapidly to scan the preselected annular portion 17 and to ascertain the power output thereof.

Annular shaped light beam 10 FIGS. 1–3, is made to impinge upon paraboloidal reflector 40 FIGS. 2 and 3, which in turn reflects forwardly the annular shaped light beam 10 and its constituent rays (represented by 18, 19, 20, 21, 22 and 23). The rays converge to paraboloidal reflector focus point 41, FIGS. 2 and 3, and thereafter diverge forwardly. Component 60, a mirror, with annular aperture or slit 61, FIGS. 2 and 3, is disposed forward of paraboloidal reflector 40 and its focus 41 and is so positioned that only the rays, such as 19, 20, 21 and 22, FIGS. 2 and 3, of the desired preselected annular portion 17 of annular shaped light beam 10 pass through, or are transmitted by, annular slit 61. The other rays, such as 18 and 23, FIGS. 2 and 3, are reflected rearwardly by mirror component 60. The transmitted rays, such as 19, 20, 21 and 22, then impinge upon concave reflector 70, FIGS. 2 and 3, which is disposed forward of mirror component 60, and said rays are reflected from and are converged by concave reflector 70. Power meter 80, FIGS. 2 and 3, is so positioned that the rays, such as 19, 20, 21 and 22 of the desired preselected annular portion 17 of annular shaped light beam 10 which are reflected from and are converged by, concave reflector 70 impinge upon, and the watt power thereof is measured by, power meter 80.

While there have been shown and described the fundamental features of my invention, as applied to a preferred embodiment and as adapted for a particular use, it is to be understood that various substitutions, omissions and adaptations may be made by those of ordinary skill in the art without departing from the spirit of the invention. For example, my invention can be used, or can be adapted to be used, to measure the power output of the entire annular shaped light beam 10, rather than an annular portion thereof, such as 17.

What is claimed is:

1. An apparatus for scanning and measuring the power output of any desired preselected annular portion of an annular shaped light beam, comprising:
    a. a paraboloidal mirror so positioned that the annular shaped light beam impinges upon it and is reflected forwardly therefrom;
    b. a movable flat mirror having a suitably located annular aperture, disposed forward of said paraboloidal mirror, for transmitting only the rays of the desired preselected annular portion of the annular shaped light beam which is reflected by said paraboloidal mirror;
    c. a concave reflector, disposed forward of said movable flat mirror, for reflecting and converging the rays of the desired preselected annular portion of the annular shaped light beam which are transmitted by said movable flat mirror having a suitably located annular aperture;
    d. and, means for measuring the power output of the rays of the desired preselected annular portion of the annular shaped light beam, with said power output measuring means so positioned that the rays of the desired preselected annular portion of the annular shaped light beam which are reflected and converged by said concave reflector impinge upon said power output measuring means and are, thereby, measured in power output.

2. The concave reflector, as set forth in claim 1, wherein said concave reflector is a concave mirror.

3. The concave reflector, as set forth in claim 1, wherein said concave reflector is a paraboloidal mirror.

4. The apparatus, as set forth in claim 1, wherein said power output measuring means is a power meter.

* * * * *